United States Patent [19]

Clifford

[11] Patent Number: 4,884,357
[45] Date of Patent: Dec. 5, 1989

[54] FISH HOOK CARRIER

[76] Inventor: James R. Clifford, 12013-22nd St., Santa Fe, Tex. 77510

[21] Appl. No.: 264,431

[22] Filed: Oct. 28, 1988

[51] Int. Cl.⁴ ............................................. A01K 97/06
[52] U.S. Cl. .................................... 43/25.2; 43/42.37; 43/54.1
[58] Field of Search ................... 43/25.2, 25, 42.37, 43/42.38, 54.1, 57.1

[56] References Cited

U.S. PATENT DOCUMENTS

| | | | |
|---|---|---|---|
| 2,767,502 | 10/1956 | Reynolds | 43/25.2 |
| 2,849,825 | 9/1958 | Reisner | 43/25.2 |
| 2,993,293 | 7/1961 | Blout | 43/57.5 |
| 3,141,258 | 7/1964 | Mayer | 43/25.2 |
| 3,142,127 | 7/1964 | Mason | 43/25.2 |
| 3,425,150 | 2/1969 | Braese | 43/25.2 |
| 3,449,851 | 6/1969 | Hall | 43/25.2 |
| 3,484,979 | 12/1969 | Wonsch | 43/20 |
| 3,800,456 | 4/1974 | Rowe | 43/25.2 |
| 4,015,361 | 4/1977 | O'Reilly et al. | 43/25.2 |
| 4,081,923 | 4/1978 | Pruncutz | 43/57.5 |
| 4,216,604 | 8/1980 | Starke | 43/25.2 |
| 4,452,003 | 6/1984 | Deutsch et al. | 43/25.2 |
| 4,667,433 | 5/1987 | Thompson | 43/25.2 |

Primary Examiner—Nicholas P. Godici
Assistant Examiner—Michael William Starkweather
Attorney, Agent, or Firm—Guy McClung

[57] ABSTRACT

This invention is directed to a carrier for fish hooks. The different embodiments of the invention are derived from the varying means of attaching the carrier to the fishing rod and from the different types of fish hooks to be enclosed.

13 Claims, 5 Drawing Sheets

FISH HOOK CARRIER

BACKGROUND OF THE INVENTION

1. Field of the Invention

This invention is directed to carriers for fish hooks and, in one embodiment, to protective carriers which can securely hold and accommodate hooks of varying type, shape, and size.

2. Description of the Prior Art

The joys of fishing, although many, can be rudely interrupted by a fish hook catching or being caught by an unwanted object. In preparing to go fishing and in actually fishing there are numerous opportunities for fish hooks to become engaged or entangled with things other than fish. Exposed hooks, particularly barbed hooks, easily hook onto things such as clothing, carpet fishing rods and reels, boat fixtures, automobile parts and even human beings.

In the past varied efforts have been made to overcome this problem, but no one has provided a simple solution which is easy to use and which can handle different hooks. No one has provided a solution which is easily attachable to and detachable from another object, such as a rod eyelet, or a device which can be formed integrally of a rod, tackle box, or tray. No one has provided a solution which can be used in conjunction with a rod in such a manner that it does not get in the way of the fisherperson's hands when actions such as casting and retrieval are done. There have long been unsatisfied needs to provide solutions to all these problems. On even date herewith applicant is filing a design patent application directed to his design for a hook carrier.

SUMMARY OF THE PRESENT INVENTION

The present invention, in one embodiment, is related to a fish hook carrier which includes a body member with a holding notch therein for receiving and holding a hook. The body member is large enough so that part of it protrudes around and beyond the hook or the barbed hook to be protected, thus either reducing the likelihood of the hook embedding in an unwanted object or eliminating this possibility altogether. Various modifications of this basic embodiment can include: a hooked portion on the body member for attaching the carrier to a rod, rod eyelet, reel part, or other member and which is easily detachable, yet can be fashioned so that it will not simply fall off; an upstanding bar extending from the body member for holding the hook and further securing it; a top cover either separate from or movably connected to the body member for enclosing a portion of the hook so that unwanted embedment is further reduced or eliminated; a latch or latches for securing the body member and cover together or other apparatus for providing a securing snap fit between body member and cover; recesses in the body member for receiving and holding a variety of hooks, including treble hooks; corresponding, complimentary, coordinating recesses in the cover; and recesses formed in the body member or in a body member cover for mounting the carrier on an item such as a rod, including, if desired, easily manipulable and attachable/detachable strap or Velcro TM securement device.

In one embodiment protrusions, ribs, or hooking means can be provided extending from a carrier body member to facilitate emplacement of a carrier with a rubber piece or elastic band. In another embodiment a connecting portion for connecting the carrier to an object can be formed of a bendable material which holds its shape.

It is, therefore, an object of the present invention to provide an efficient, novel, simple, and nonobvious fish hook carrier.

It is also an object of this invention to solve the various problems associated with the use and transport of fish hooks.

Yet another object of this invention is the provision of a fish hook carrier which can secure fish hooks of varying shapes, types, and sizes.

A further object of this invention is the provision of a fish hook carrier which is easily attachable to and detachable from a rod, rod eyelet, or other member.

An additional object of this invention is the provision of a hook carrier which can be formed integrally of a rod, reel, tackle box, or other member.

Yet another object of this invention is the provision of a hook carrier which can enclose a portion of the hook for further protection of the hook or the barbed hook.

A further object of this invention is the provision of a hook carrier which satisfies the long-felt needs described above.

The present invention recognizes and addresses the previously-mentioned long-felt needs and provides a satisfactory meeting of those needs in its various embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings and photographs. Although these descriptions are detailed to insure adequacy and aid understanding, this is not intended to prejudice that purpose of a patent which is to claim an invention no matter how others may later disguise it by variations in form or additions or further improvements. The claims at the end of this specification are intended as the chief aid toward this purpose.

DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only preferred embodiments of the invention and are therefore not to be considered limiting of its scope, for the invention may admit to other equally effective embodiments.

DESCRIPTION OF PRESENTLY-PREFERRED EMBODIMENTS

Figure 1:
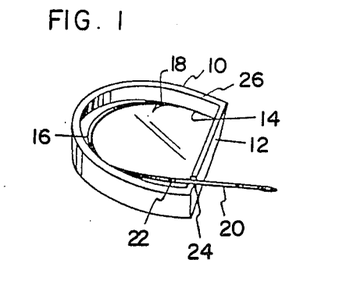
FIG. 1 is a perspective view of a hook carrier according to this invention with a hook therein.

As shown in FIG. 1, a fishing hook carrier 10 according to the present invention has a body member 12 and a body member recess 14 in the body member 12 for receiving a portion 16 of a shank 22 of a hook 20, including a hook end 18 of the hook 20. A part of shank 22 is received in and held by a shank notch 24 in the body member 12. The body member recess 14 is sufficiently deep that the hook end 18 does not protrude above a top edge 26 of the body member recess 14.

Figure 2:
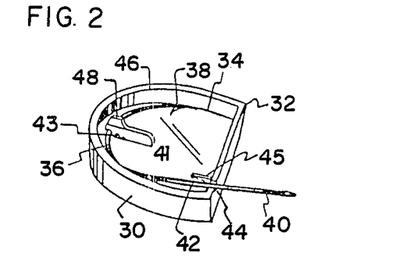
FIG. 2 is a perspective view of a hook carrier according to this invention with a hook therein.

A fish hook carrier 30 according to the present invention is shown in FIG. 2. The carrier 30 has a body member 32 with a body member recess 34 for receiving a portion 36 of a shank 42 of a hook 40, including a hook end 38 of the hook 40. A part of the shank 42 is received in and held by a shank notch 44 in the body member 32. The body member recess 34 is sufficiently deep that the hook end 38 does not protrude above a top edge 46 of the body member recess 34. An upstanding bar 48 which is disposable in and is disposed in a space 43 between the bar 48 and a surface 41 of the body member 32 protrudes at an angle from the body member 32 to which it is attached or of which it is integrally formed. The bar 48 holds and further secures the hook 40 on and to the body member 32. A ridge 45 projecting from the body member 32 abuts the hook shank 42 to further stabilize the hook 40 in the carrier 30.

Figure 3:
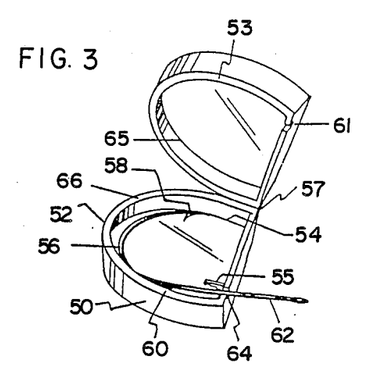
FIG. 3 is a perspective view of a hook carrier according to this invention with a hook therein.

A fish hook carrier 50 according to the present invention is shown in FIG. 3. The carrier 50 has a body member 52 with a body member recess 54 for receiving a portion 56 of a shank 62 of a hook 60, including a hook end 58 of the hook 60. A part of the shank 62 is received in and held by a shank notch 64 in the body member 52. The body member recess 54 is sufficiently deep that the hook end 58 does not protrude above a top edge 66 of the body member recess 54. A ridge 55 projecting from the body member 52 abuts the hook shank 62 to stabilize the hook 60 in the carrier 50. A cover 53 is movably connected to the body member 52 such as by a plastic hinge 57. The cover 53 is movable to contact the body member 52 to close over it and over the portion of the hook 60 within the body member 52. The cover 53 has a cover shank notch 61 corresponding in configuration and location to the shank notch 64 so that upon closing of the cover 53 the shank part received and held in the shank notch 64 is also held by the cover shank notch 61. In the event a hook would protrude above the top edge 66 of the body member 52, a recess 65 can be provided in the cover 53 to accommodate the hook so that the cover is closable and yet the hook would be enclosed in the carrier 50.

Figure 4:
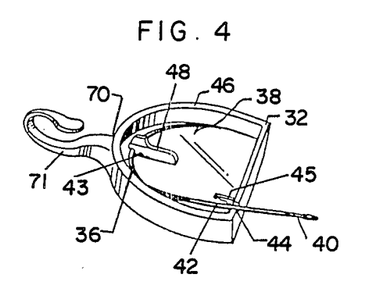
FIG. 4 is a perspective view of a hook carrier according to this invention with a hook therein.

A fish hook carrier 70 according to this invention shown in FIG. 4 has parts similar to those of the carrier 30 of FIG. 2 which bear identical identifying numbers. In addition the carrier 70 has a hooking portion 71 connected to or formed integrally of its body member 32. This hooking portion 71 makes it possible to removably attach the carrier 70 to an object such as a fishing rod, a rod eyelet, a part of a fishing reel such as the crank handle, or to some other object.

Figure 5:
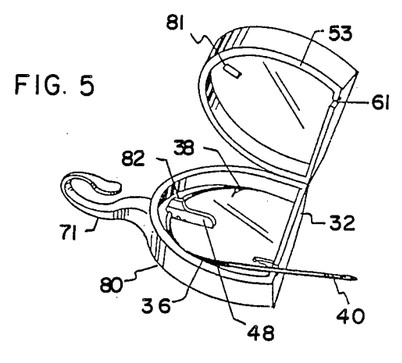
FIG. 5 is a perspective view of a hook carrier according to this invention with a hook therein.
Figure 6:
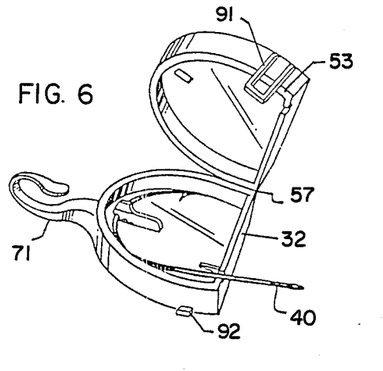
FIG. 6 is a perspective view of a hook carrier according to this invention with a hook therein.

A fish hook carrier 80 as shown in FIG. 5 has some of the features of the carrier 30 and 70 shown in FIGS. 2 and 4 respectively; features or parts which are the same bear identifying numerals identical to those of these other carriers. In addition the carrier 80 has a cover recess 81 for receiving and holding a tip 82 of the upstanding bar 48. A carrier 90 according to this invention as shown in FIG. 6 is like the carrier 80 of FIG. 5 with the addition of a latch 91 on the cover 53 which is movable to latch over a projecting rib 92 on the body member 32 to secure the cover 53 to the body member 32. Of course other suitable securement devices are within the scope of this invention, including but not limited to an embodiment in which the cover 53 is not hinged or otherwise connected to the body member 32 and a snap fit or tongue-and-groove combination is provided to hold the two pieces together.

Figure 7:
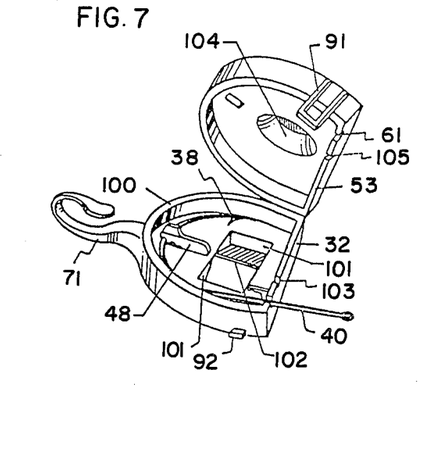
FIG. 7 is a perspective view of a hook carrier according to this invention with a hook therein.

A carrier 100 according to this inventions as shown in FIG. 7 is like other carriers already disclosed and identical identifying numerals are used to designate the same parts. In addition the carrier 100 can accommodate and hold a treble hook (not shown) which has three hook ends (not shown). Two sloping hook end recesses 101 are formed in the body member 32 along with a shank recess 102 which extends to a treble hook shank notch 103 in the body member 32 for receiving and holding a shank (not shown) of the treble hook. For the third hook end of the treble hook a cover treble hook recess 104 is provided in the cover 53 which is disposed so that as and when the cover 53 is closed the third hook end of the treble hook is received in the cover treble hook recess 104. Similarly, a cover treble hook shank notch 105 is provided to compliment and correspond to the body member treble hook shank notch 103.

Figure 8:
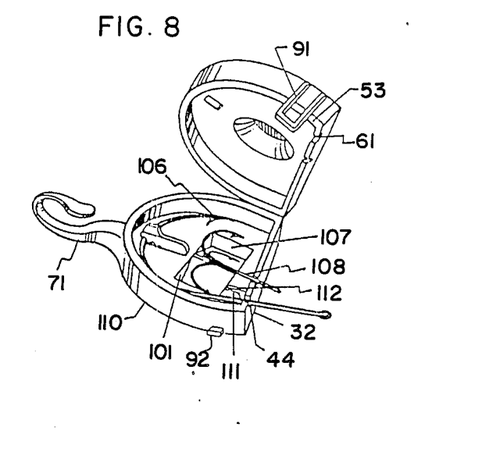
FIG. 8 is a perspective view of a hook carrier according to this invention with a hook therein.

A carrier 110 according to this invention as shown in FIG. 8 is like other carriers already described and the same identifying numerals designate similar parts. A treble hook 108 with three hook ends (one of them, 106 is shown) is in place with two hook ends in hook recesses 101 in the body member 32. In addition the carrier 110 has a recess 111 in a bridge member 112 which projects from the body member 32. A very small hook (not shown) can be placed partially in the carrier 110 with its hook end disposed in and/or through the recess 111 and with its shank in the shank notches 44 and 61. Although not shown, a bridge member 112 can be disposed anywhere on the body member 32 to receive a hook end, such as the hook end 38 of FIG. 7.

Figure 9:
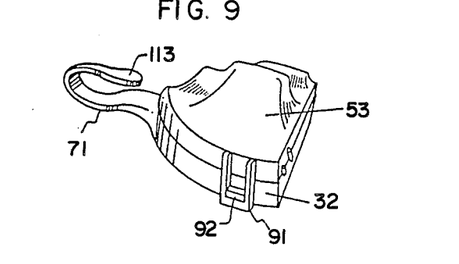
FIG. 9 is a perspective view of the carrier of FIG. 7.
Figure 10:
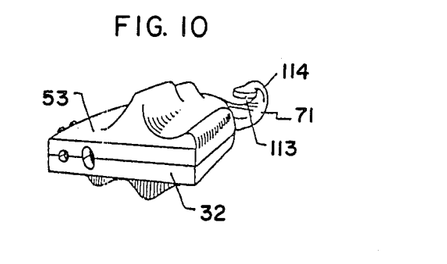
FIG. 10 is another perspective view of the carrier of FIG. 7.
Figure 11:
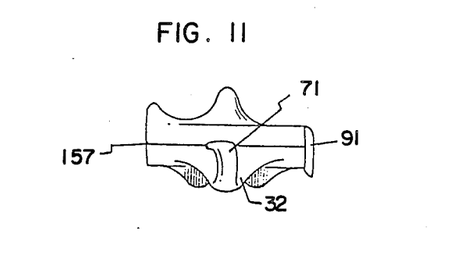
FIG. 11 is a rear view of the carrier of FIG. 7.
Figure 12:
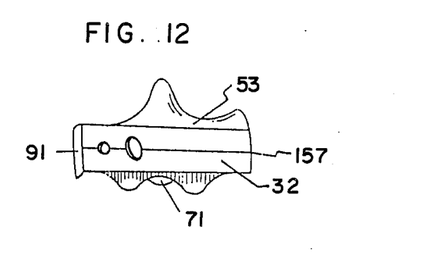
FIG. 12 is a front view of the carrier of FIG. 7.

FIGS. 9-12 are various view of a carrier such as the carriers 100 and 110 of FIGS. 7 and 8 respectively. As shown in FIGS. 9 and 10, the hooking portion 71 has an enlarged end 113 which, when inserted through a rod eyelet of a proper size, will make it more difficult for the hooking portion to accidentally fall out of the eyelet. Also the end 113 is turned to the side with respect to a main body 114 of the hooking portion 71 which further makes it more difficult for the hooking portion to fall out of a properly sized eyelet. A hinge 157 (FIGS. 11-12) is like the hinge 57 of FIG. 3.

Figure 13:
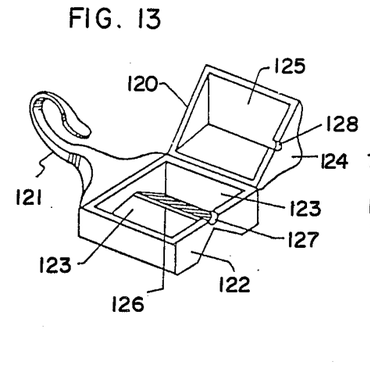
FIG. 13 is a perspective view of a hook carrier according to this invention.

A carrier 120 according to this invention is shown in FIG. 13. The carrier 120 has a body member 122 and a cover 124 movably connected thereto. A hooking portion 121 extends from the body member 122. The carrier 120 can accommodate and hold a treble hook (not shown) in two hook end recesses 123 in the body member 122 and a third hook end recess 125 in the cover 124. A hook shank recess 126 and two shank notches 127 (in the body member 122) and 128 (in the cover 124) hold and accommodate the shank of a treble hook.

Figure 14:
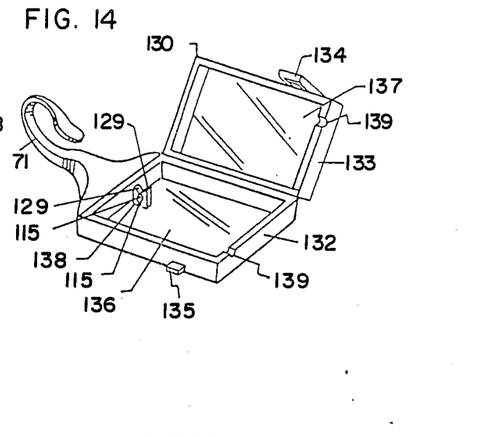
FIG. 14 is a perspective view of a hook carrier according to this invention.

FIG. 14 illustrates a hook carrier 130 which has a body member 132 to which is movably connected a cover 133. A latch 134 on the cover 133 coacts with a projecting rib 135 on the body member 132 to secure the cover in a closing position on the body member 132. A recess 136 in the body member 132 and a recess 137 in the cover 133 accommodate a hook (not shown) which has a shank which can be held by a snap holder 138 on the body member 132. The snap holder 138 has two opposed upstanding arms 129 each of which has a recess 115 therein. The hook shank can be pushed or snapped through the top of the arms 129 into the area of the recesses 115 wherein it is firmly held. Shank notches 139 on the body member and on the cover function as the notches 61 and 41 of FIG. 8.

Figure 15:
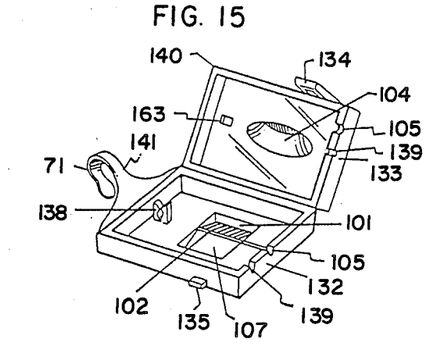
FIG. 15 is a perspective view of a hook carrier according to this invention.

A carrier 140 as shown in FIG. 15 according to this invention is similar to that of FIG. 14 and similar parts are identified with the same identifying numerals. In addition the carrier 140 has recesses like the recesses 101, 102, 104, of FIG. 7 and a shank notch 105. A hooking portion 141 projecting from the body member 132 is not twisted to the side. A recess 163 in the cover 133 receives a portion of the snap holder 138 upon closing of the cover 133.

Figure 16:
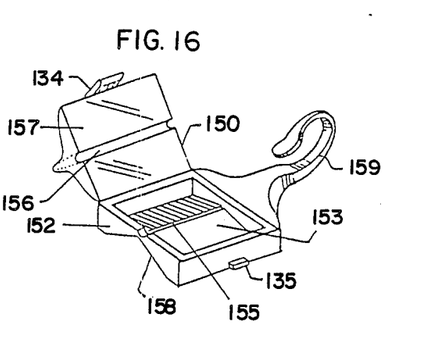
FIG. 16 is a perspective view of a hook carrier according to this invention.

A carrier 150 shown in FIG. 16 has a body member 152 with two treble hook end recesses 153 and 154 therein which function as the recesses 101 and a shank recess 155 which functions as the shank recess 102. A third treble hook end recess 156 in a cover 157 movably connected to the body member 132 receives the third treble hook end (not shown). A recess 158 formed in the bottom of the body member 152 can be configured to match or mate with a surface of an object on which the carrier is to be placed or to which it is to be connected. A hook portion 159 connected to or formed integrally of the body member 152 provides removable attachability of the carrier 150 to an object such as a rod, rod eyelet, or reel.

Figure 17:
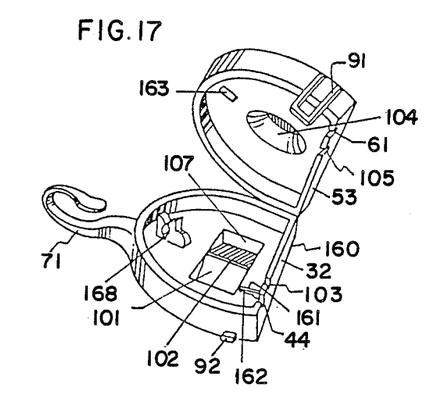
FIG. 17 is a perspective view of a hook carrier according to this invention.

A carrier 160 according to this invention as shown in FIG. 17 is like the carrier 100 of FIG. 7 and similar parts bear the same identifying numerals. In place of the upstanding bar 48, however, the carrier 160 has a snap holder 168 which functions like the snap holder 138 of the carrier 140 of FIG. 15. Also the carrier 160 has a bridge member 161 with a bridge recess 162 which function like the bridge member 112 and recess 111 of the carrier 110 of FIG. 8. A recess 163 is provided in the cover 53 to receive a part of the snap holder 168 upon closing of the cover 53 to further stabilize a hook held in the snap holder 168.

Figure 18:
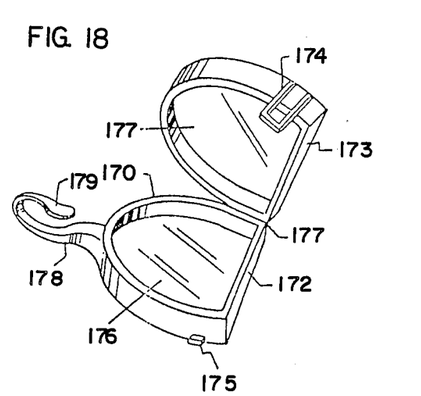
FIG. 18 is a perspective view of a hook carrier according to this invention.

A carrier 170 according to this invention as shown in FIG. 18 has a body member 172 and a cover 173 movably and hingedly connected to the body member 172 by a hinge 177. A latch 174 and a rib 175 provide secured closing of the carrier 170. A recess 176 in the body member 132 and a recess 177 in the cover 173 receive and accommodate a hook or hooks. A hooking portion extending from and connected to the body member 172 provides a means to removably attach the carrier 170 to another object. An end 179 of the hooking portion 178 is turned to the side to make it more difficult for the hooking portion to accidentally become unattached.

Figure 19:
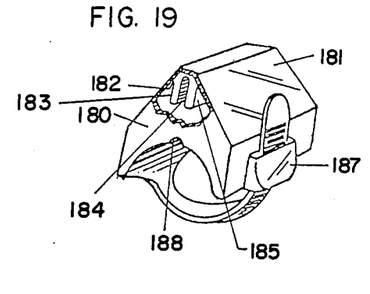
FIG. 19 is a perspective view of a hook carrier according to this invention.

A carrier 180 according to this invention is shown in FIG. 19. The carrier 180 has a body 181 which has an interior surface 182 with recesses 183, 184, 185 formed therein for receiving and holding one or more hook ends of a hook (not shown) to be carried by the hook carrier 180. A strap 186 is connected to or formed integrally of the body 181 and extends so that it can wrap around an object (e.g. a rod) and be received and removably held in and extend through a holder 187 connected to or formed integrally of the body 181. A notch 188 in the body 181 can receive either a fishing line with a hook attached or a hook shank.

Figure 20:
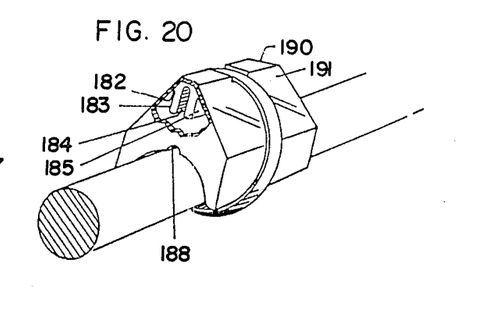
FIG. 20 is a perspective view of a hook carrier according to this invention on a rod.

A carrier 190 according to this invention is shown in FIG. 20 which is similar to the carrier 180 shown in FIG. 19, with like parts bearing the same identifying numerals. A strap 191 extends around the body member 191 and through a recess 192 on the body member 191. It can be affixed or held tight with pieces of Velcro TM suitably placed on the strap.

Figure 21:
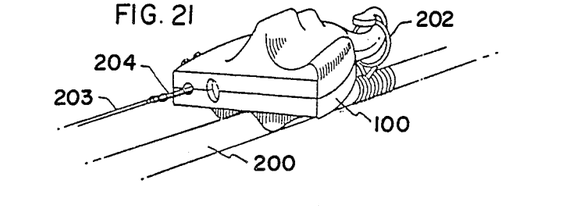
FIG. 21 is a perspective view of a hook carrier as shown in FIG. 10 with its hook through an eyelet on a rod.

A rod 200 as shown in FIG. 21 has a hook carrier 100 as shown in FIG. 7 attached to an eyelet 202 of the rod 200. A fishing line 203 from a reel (not shown) on the rod has a hook 204 tied to it which is like the hook 40 of FIG. 7. The hook 204 is carried in and held by the carrier 100.

Figure 22:
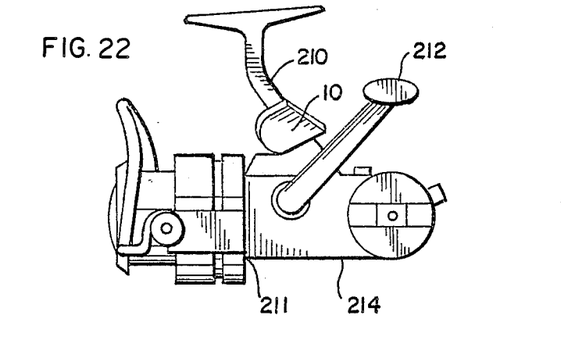
FIG. 22 is a side view of a fishing reel according to this invention.

A reel 210 according to this invention as shown in FIG. 22 has a reel body 214 and reeling mechanism 211 mounted therein and thereon and a reel crank handle 212 for moving the reeling mechanism 211. Secured to or formed integrally of the reel body 214 is a hook carrier 10 according to this invention as shown in FIG.

1. Of course the hook carrier could be of the types disclosed in FIGS. 2-20.

Figure 23:
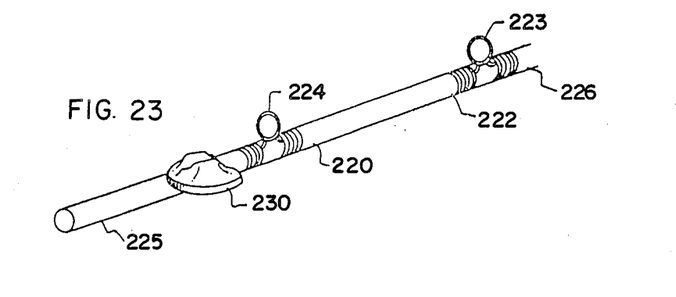
FIG. 23 is a perspective view of a fishing rod according to this invention.

A rod 220 according to this invention as shown in FIG. 23 has an elongated rod body 222 and eyelets 223 and 224 secured thereto. Secured to or formed integrally of the rod body 222 is a hook carrier 230 which is like the carrier shown in FIG. 10 but without a hooking portion 71. The carrier is disposed so that it does not interfere with fishing line passing from a reel (not shown) on the handle 225 through the eyelets. Of course, the carrier can be disposed elsewhere on the rod (e.g. on the side beneath the eyelets) or further near a rod tip 226.

Figure 24:
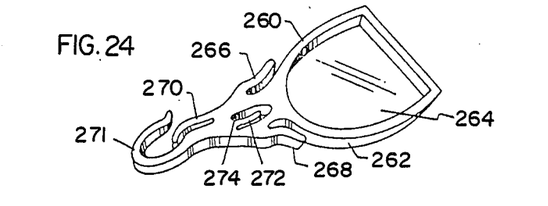
FIG. 24 is a perspective view of a hook carrier according to the present invention.
Figure 25:
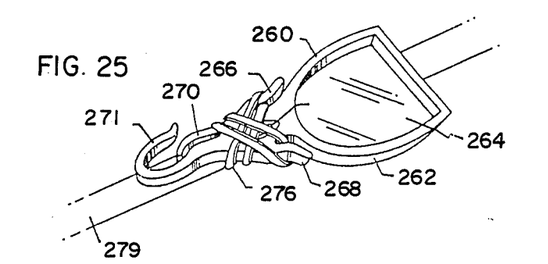
FIG. 25 is a perspective view of a fishing rod having a carrier connected thereto as shown in FIG. 24.

As shown in FIG. 24, a hook carrier 260 according to this invention has a body member 262 and a hook recess 264 therein for holding part or all of a hook or hooks. A hooking portion 271 extends from the body member 262 and has various protruding fingers 266, 268 and 270 for facilitating the emplacement of the carrier 260 on an object with a rubber piece or an elastic band. This is shown in FIG. 25 where the carrier 260 is shown connected to a rod 279 by means of rubber band 276 which encircles the hooking portion of the carrier 260 and the fingers 266 and 268. The carrier 260 also has a hole 274 therethrough and a rib 272 protrudes from the hooking portion 271 into the hole. The rib 272 can provide an easy connector or attachment for a rubber band or elastic piece to help in securing the carrier to an object.

Figure 26:
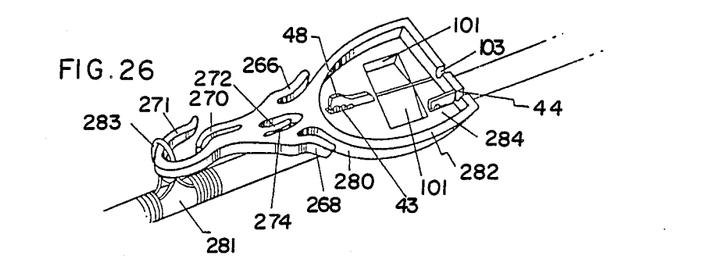
FIG. 26 is a perspective view of a fishing rod with a hook carrier connected thereto according to the present invention.

A carrier 280 according to this invention is like the carrier 260 in some aspects and like the carrier 110 (FIG. 8) in some aspects and the same identifying numerals are used for these aspects. The carrier 280 has a body member 282 and a recess 284 therein for receiving all or part of a hook or hooks. A hooking portion 271 is shown disposed through and engaging an eyelet 283 of a rod 281.

Figure 27:
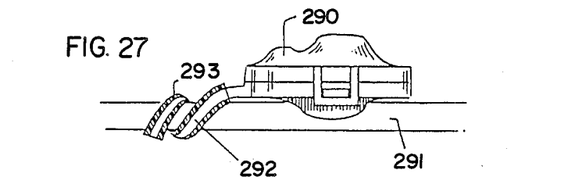
FIG. 27 is a side view of a fishing rod with a hook carrier connected thereto according to the present invention.

A carrier 290 shown in FIG. 27 is like the carrier 110 (FIG. 8); but instead of a hooking portion 71 it has a connector 292 formed of a bendable material (conventionally and commercially available) which holds its shape when bent to facilitate connection of the carrier to an object. A protective tube 293 can be used around part or all of the connector 292. As shown in FIG. 27 the connector 292 has been bent to encircle the rod 291.

Figure 28:
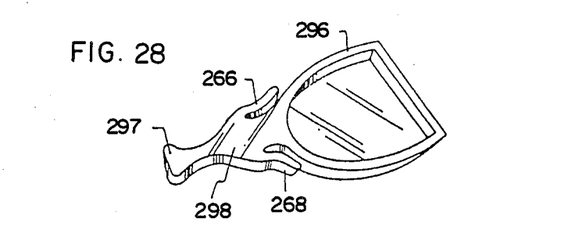
FIG. 28 is a top view of a hook carrier according to the present invention.

A carrier 296 shown in FIG. 28 according to this invention has a protruding arm 298 with a bulb end 297 for insertion into an opening (e.g. an eyelet opening) and two extending fingers 266, 268 (previously described).

While there have been described various embodiments of the present invention, the apparatuses described are not intended to be understood as limiting the scope of the invention. It is realized that changes therein are possible and it is further intended that each element recited in any of the following claims is to be understood as referring to all equivalent elements for accomplishing substantially the same results in substantially the same or an equivalent manner.

I claim:

1. A fish hook carrier for a hook having a shank and a hook end, the carrier comprising:
    a body member
    a body member recess in the body member for receiving a portion of the hook including at least the hook end of the hook,
    a shank notch in the body member for receiving and holding a portion of the shank
    an upstanding bar protruding from the body member and spaced apart from the shank notch,
    the upstanding bar projecting at an angle for holding and securing the hook on the body member,
    the upstanding bar has a series of recesses for receiving hooks of different sizes.

2. The carrier of claim 1 including also:
    a cover securable to the body member,
    the cover for closing over the body member and the portion of the hook received by the body member.

3. The carrier of claim 1 including also:
    a hooking portion connected to or formed integrally of the body member for removably attaching the carrier to another object.

4. The carrier of claim 1 wherein
    the body member has a recess means therein for receiving and holding two hook ends of a treble hook having three hook ends.

5. The carrier of claim 4 including also:
    a cover securable to the body member for closing over the body member and the portions of the second hook received in the recess means,
    the cover having a cover recess therein for receiving the third hook end of the treble hook.

6. The carrier of claim 1 including also:
    a latch on the cover, and
    a rib on the bottom member, the latch movable to engage the rib to secure the cover and body member together.

7. The carrier of claim 1 including also:
    a snap holder on the body member for receiving and holding a portion of the hook,
    the snap holder comprising dual opposed upstanding arms having a small opening through which a portion of the hook can be pushed, the arms moving outwardly upon such pushing to permit the hook portion to pass between the arm, and a snap holder recess in communication with the small opening, the hook portion passing into and being held by the snap holder recess, the arms moving back to their original position after the hook portion passes through them.

8. A fish hook carrier for a hook having a shank and a hook end, the carrier comprising:
    a body member,
    a body member recess in the body member for receiving a portion of the hook including at least the hook end of the hook,
    a shank notch in the body member for receiving and holding a portion of the shank,
    an upstanding bar protruding from the body member and spaced apart from the shank notch, the upstanding bar projecting at an angle for holding and securing the hook on the body member, the upstanding bar having a series of recess for receiving hooks of different sizes,
    a cover securable to the body member,
    the cover for closing over the body member and the portion of the hook received by the body member,
    a hooking portion connected to or formed integrally of the body member for removably attaching the carrier to another object,
    the body member having a recess means therein for receiving and holding two hook ends of a treble hook having three hook ends,
    the cover for closing over the portions of the second hook received in the recess means, the cover having a cover recess therein for receiving the third hook end of the treble hook,
a latch on the cover,
a rib on the bottom member,
the latch movable to engage the rib to secure the cover and body member together, and
a snap holder on the body member for receiving and holding a portion of the hook, the snap holder comprising dual opposed upstanding arms having a small opening through which a portion of the hook can be pushed, the arms moving outwardly upon such pushing to permit the hook portion to pass between the arm, and a snap holder recess in communication with the small opening, the hook portion passing into and being held by the snap holder recess, the arms moving back to their original position after the hook portion passes through them.

9. A fish hook carrier for a treble hook having a shank and three hook ends, the carrier comprising:
a body member,
recess means in the body member for receiving two of the three hook ends,
a shank notch in the body member for receiving and holding the shank of the hook and through which the shank projects,
a cover securable to the body member for closing over the body member and portions of the hook received in the body member,
the cover having a cover recess for receiving one of the hook ends, and means for receiving and holding a second hook having only one hook end.

10. The carrier of claim 9 including also a hooking portion connected to or formed integrally of the body member for removably attaching the carrier to another object.

11. A fish hook carrier for a treble hook having a shank and three hook ends, the carrier comprising:
a body member,
recess means in the body member for receiving two of the three hook ends,
a shank notch in the body member for receiving and holding the shank of the hook and through which the shank projects,
a cover securable to the body member for closing over the body member and portions of the hook received in the body member,
the cover having a cover recess for receiving one of the hook ends.
a hooking portion connected to or formed integrally of the body member for removably attaching the carrier to another object,
holding means for receiving and holding a second hook having only one hook end, and
a snap holder on the body member for receiving and holding a portion of the hook, the snap holder comprising dual opposed upstanding arms having a small opening through which a portion of the hook can be pushed, the arms moving outwardly upon such pushing to permit the hook portion to pass between the arm, and a snap holder recess in communication with the small opening, the hook portion passing into and being held by the snap holder recess, the arms moving back to their original position after the hook portion passes through them.

12. A fish hook carrier in combination with a fishing rod comprising:
an elongated rod member and
a fish hook carrier secured to the rod member or formed integrally thereof;
the fish hook carrier comprising:
a body member
a body member recess in the body member for receiving a portion of the hook including at least the hook end of the hook,
a shank notch in the body member for receiving and holding a portion of the shank,
an upstanding bar protruding from the body member and spaced apart from the shank notch,
the upstanding bar projecting at an angle for holding and securing the hook on the body member,
the upstanding bar having a series of recess for receiving hooks of different sizes,
a cover securable to the body member,
the cover for closing over the body member and the portion of the hook received by the body member,
a hooking portion connected to or formed integrally of the body member for removably attaching the carrier to another object,
the body member having a recess means therein for receiving and holding two hook ends of a treble hook having three hook ends, and
a cover securable to the body member of closing over the body member and the portions of the second hook received in the recess means, the cover having a cover recess therein for receiving the third hook end of the treble hook.

13. A fish hook carrier in combination with a fishing reel for reeling in a line thereon or for emitting it therefrom, the reel comprising:
a reeling mechanism
a body to which the reeling mechanism is mounted, and
a fish hook carrier secured to the body or formed integrally thereof;
the fish hook carrier comprising:
a body member
a body member recess in the body member for receiving a portion of the hook including at least the hook end of the hook,
a shank notch in the body member for receiving and holding a portion of the shank
an upstanding bar protruding from the body member and spaced apart from the shank notch,
the upstanding bar projecting at an angle for holding and securing the hook on the body member,
the upstanding bar having a series of recess for receiving hooks of different sizes,
a cover securable to the body member,
the cover for closing over the body member and the portion of the hook received by the body member,
a hooking portion connected to or formed integrally of the body member for removably attaching the carrier to another object,
the body member having a recess means therein for receiving and holding two hook ends of a treble hook having three hook ends, and
a cover securable to the body member for closing over the body member and the portions of the second hook received in the recess means, the cover having a cover recess therein for receiving the third hook end of the treble hook.

* * * * *